(12) United States Patent
Fikouras et al.

(10) Patent No.: US 8,224,933 B2
(45) Date of Patent: Jul. 17, 2012

(54) METHOD AND APPARATUS FOR CASE-BASED SERVICE COMPOSITION

(75) Inventors: Ioannis Fikouras, Aachen (DE); Raphaël Quinet, Liège (BE); Eugen Freiter, Aachen (DE); Joerg Niemoeller, Herzogenrath (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 639 days.

(21) Appl. No.: 12/393,846

(22) Filed: Feb. 26, 2009

(65) Prior Publication Data

US 2010/0218202 A1  Aug. 26, 2010

(51) Int. Cl.
*G06F 15/177* (2006.01)
(52) U.S. Cl. ...................................... 709/221
(58) Field of Classification Search .................... 709/221
See application file for complete search history.

(56) References Cited

U.S. PATENT DOCUMENTS

| | | | | |
|---|---|---|---|---|
| 6,347,312 B1 * | 2/2002 | Byrne et al. | ........................... | 1/1 |
| 7,734,515 B1 * | 6/2010 | Frederick et al. | ............ | 705/26.1 |
| 7,788,225 B2 * | 8/2010 | Fish et al. | ..................... | 707/624 |

FOREIGN PATENT DOCUMENTS

| | | |
|---|---|---|
| EP | 1 978 758 A1 | 10/2008 |
| WO | WO 2008 119364 A1 | 10/2008 |

OTHER PUBLICATIONS

Rao, J. and Su, X. A Survey of Automated Web Service Composition Methods. SWSPC 2004, LNCS 3387, pp. 43-54. 2005.*
Seligman, L. and Kerschberg, L. A Mediator for Approximate Consistency: Supporting 'Good Enough' Materialized Views. Journal of Intelligent Information Systems 8, pp. 203-205. 1997.*
Hwang et al. Dynamic Web Service Selection for Reliable Web Service Composition. IEEE Transactions on Services Computing. vol. 1, No. 2. Apr.-Jun. 2008.*

* cited by examiner

*Primary Examiner* — John Macilwinen

(57) ABSTRACT

An apparatus for creating composite services includes a processing unit which identifies at least one constituent component for a composite service by a processor unit. The constituent component has a runtime state. The apparatus includes a data-store having past composition decisions and corresponding runtime states. The processing unit locates a past composition decision regarding the constituent component that has essentially the equivalent runtime state in the data-store, and reuses the past composition decision for the constituent component for the composite service. A method for creating composite services includes the steps of identifying at least one constituent component for a composite service by a processor unit, the constituent component having a runtime state. There is the step of locating a past composition decision regarding the constituent component that has essentially the equivalent runtime state in a data-store by the processing unit. There is the step of reusing the past composition decision for the constituent component for the composite service by the processor unit.

20 Claims, 5 Drawing Sheets

METHOD AND APPARATUS FOR CASE-BASED SERVICE COMPOSITION

TECHNICAL FIELD

The present invention pertains to creating composite services. (As used herein, references to the "present invention" or "invention" relate to exemplary embodiments and not necessarily to every embodiment encompassed by the appended claims.) More specifically, the present invention pertains to creating a composite service where a past composition decision is reused for a constituent component for the composite service if the past composition decision regarding the constituent component has essentially an equivalent runtime state.

BACKGROUND

This section is intended to introduce the reader to various aspects of the art that may be related to of the present invention. The following discussion is intended to provide information to facilitate a better understanding of the present invention. Accordingly, it should be understood that statements in the following discussion are to be read in this light, and not as admissions of prior art.

IMS

SIP protocol is one of the core technologies used by IMS (Internet Multimedia Subsystem). It is used for control over the multimedia sessions combining voice and data streams.

IMS provides a lot of common functions used by mobile IMS networks, e.g. AAA (authentication, authorization), charging, access control, HSS (user profile databases), etc. These functions of IMS are meant to be used by the converged applications in a uniform way, so that there is no need to have separate mechanisms for these functions applied for voice communications and different ones for the data communications.

SCIM

The Service Capability Interaction Manager (SCIM) was introduced in 3GPP TS 23.002, FIG. 6a: "Functional architecture for the provision of service in the IMS" as a function within the "SIP Application Server" domain of the IMS architecture.

The role of the SCIM is that of service broker in more complex service interaction scenarios than can be supported through the service filtering mechanism; for example feature interaction management that provides intricate intelligence, such as the ability to blend Presence and other network information, or more complex and dynamic application sequencing scenarios. The SCIM as proposed to the 3GPP uses ISC and SIP interfaces to enable composite service behaviour leveraging simpler service components.

Although there is only a small amount of text in the 3GPP Release 6 specifications describing this function it is clear that it is intended to be a placeholder for an obviously necessary but vendor-defined solution to a common problem: orchestration of interaction between "Capabilities" in the larger network which are represented as SIP Application Server instances.

In practical terms, a "capability" is a system component that may be used (presumably with other components) to implement a "service" that is packaged and delivered to end users of the network. For example, a group list server and a presence server may both be considered "capabilities" that are used to implement a sophisticated conferencing service.

Service Composition

Composite services are created through aggregation of existing services. They address complex user requirements that cannot be covered by existing services. Composite services offer added value (i.e., in the form of new functionality) compared to the sum of the functionality of their building blocks.

Consider basic services and enablers like a weather forecasting service and a positioning data service. Both can be used individually, however combining them into a composite service that provides a location based weather forecast creates a new type of functionality with clear added value. For this reason composite services are often referred to as value added services.

FIG. 1 illustrates a case were a location based service, specifically a location based weather forecast is created out of two existing components, an enabler that provides location information and a weather forecast service.

The exposure of these functions as SOA services allows an application to individually discover them by querying a service repository and then individually bind them as depicted in the left part of the previous figure. The process of discovering appropriate services as well as the far more complex logic for binding them and making use of their functionality is implemented in the application itself. This functionality is symbolized by the set of gears in the application box on the left part of the figure. The developer of the application logic in this case needs to consider and cover all eventualities at design time (i.e. faulty services), possibly a number of different technologies/formats, and a host of other issues that are not directly related to the actual end-user service, but rather to the usage of the enabling services.

In contrast, service composition functionality as illustrated in the right part of the previous figure, introduces an entity—the service composition engine—that takes care of this complexity for the application. In this scenario the application implements just its core logic, whereas the enabling functionality "location-based weather forecast" is exposed by the composition engine as a single service that may be easily discovered and bound by the application. In this case the composition engine executes application logic in the form of the definition of the composite service "location-based weather forecast". This composite service describes the type of required services, so that the engine—at run-time—may discover, bind and execute appropriate services.

Composition functionality consequently allows for great flexibility e.g. in handling events such as a faulty enabler. In this case the engine could find an alternative service without any disruption of the end-user application. This scenario is illustrated by FIG. 1.

The discussed application scenario illustrates how service composition enables the decoupling of application logic and enabling functions. By extracting parts of the logic from the application and implementing it in a formalized way with the help of a composition entity (engine) a number of advantages become possible. The application logic becomes easily reusable and adaptable, it also becomes easier to implement, since it may make use of the event-driven facilities of the composition engine.

Decoupling of application logic and exposure of functionality as reusable services is clearly facilitated by component-based software development and modelling of the application functionality. On the one hand software components (or groups thereof) already represent cleanly broken down units of functionality i.e. good candidates for services. Consequently, understanding of the application functionality based on its modelling is the basic requirement for defining aggregate application functionality in a composition.

Problems with Existing Solutions

A Service Capability Interaction Manager (or SCIM) orchestrates service delivery among application server platforms within the IP Multimedia Subsystem architecture. The Service Capability Interaction Manager (SCIM) was introduced in 3GPP TS 23.002.

In practical terms, a "capability" is a system component that may be used (presumably with other components) to implement a "service" that is packaged and delivered to end users of the network. For example, a group list server and a presence server may both be considered "capabilities" that are used to implement a sophisticated conferencing service.

Service composition technology may be used to implement a SCIM as described in references PCT/EP2007/002956 and EP 07010735-4. However, the approach described in references PCT/EP2007/002956 and EP 07010735-4 implies an increase of resources used by the Composition Engine and latency added to session establishment that corresponds to the number of constituent components included in the composite service created.

Customer requirements in this area state that the latency imposed by the SCIM node should not exceed 20 ms. In cases where the number of constituent services is small, this overall limit is possible to fulfill. However, with increased complexity of the composite-services created, the additional latency introduced by the SCIM becomes a major concern.

This invention optimizes the composition creation process by reducing the number of decisions that need to be made in order to create a new composite service. It has the potential to make composition creation latency constant regardless of the size of the composite service.

BRIEF SUMMARY OF THE INVENTION

The present invention pertains to an apparatus for creating composite services. The apparatus comprises a processing unit which identifies at least one constituent component for a composite service by a processor unit. The constituent component has a runtime state. The apparatus comprises a data-store having past composition decisions and corresponding runtime states. The processing unit locates a past composition decision regarding the constituent component that has essentially the equivalent runtime state in the data-store, and reuses the past composition decision for the constituent component for the composite service.

The present invention pertains to a method for creating composite services. The method comprises the steps of identifying at least one constituent component for a composite service by a processor unit, the constituent component having a runtime state. There is the step of locating a past composition decision regarding the constituent component that has essentially the equivalent runtime state in a data-store by the processing unit. There is the step of reusing the past composition decision for the constituent component for the composite service by the processor unit.

BRIEF DESCRIPTION OF THE DRAWINGS

In the accompanying drawings, the preferred embodiment of the invention and preferred methods of practicing the invention are illustrated in which.

DETAILED DESCRIPTION OF THE INVENTION

Figure 8:
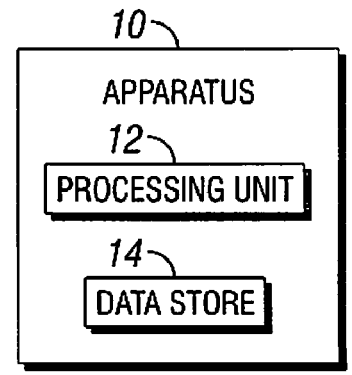
FIG. 8 is a block diagram of the apparatus of the present invention.

Referring now to the drawings wherein like reference numerals refer to similar or identical parts throughout the several views, and more specifically to FIG. 8 thereof, there is shown an apparatus 10 for creating composite services. The apparatus 10 comprises a processing unit 12 which identifies at least one constituent component for a composite service by a processor unit. The constituent component has a runtime state. The apparatus 10 comprises a data-store 14 having past composition decisions and corresponding runtime states. The processing unit 12 locates a past composition decision regarding the constituent component that has essentially the equivalent runtime state in the data-store 14, and reuses the past composition decision for the constituent component for the composite service.

The processing unit 12 can reuse the past composition decision for the constituent component without renewed consultation of the runtime state or renewed use of a composition algorithm. The composition decision can be considered valid when all relevant runtime states are unchanged. The data store can have a composition state for composite services previously created and corresponding runtime state for each composition state. The processing unit 12 can create composition engine state snapshots in the data-store 14 during runtime by storing a snapshot for each created composite service. Each composition engine state snapshot can have a reference to a corresponding composite service template, a resulting composite service, and a runtime system state at a time of composite service creation.

The present invention pertains to a method for creating composite services. The method comprises the steps of identifying at least one constituent component for a composite service by a processor unit, the constituent component having a runtime state. There is the step of locating a past composition decision regarding the constituent component that has essentially the equivalent runtime state in a data-store 14 by the processing unit 12. There is the step of reusing the past composition decision for the constituent component for the composite service by the processor unit.

The reusing step can include the step of reusing the past composition decision for the constituent component without renewed consultation of the runtime state or renewed use of a composition algorithm. The composition decision can be considered valid when all relevant runtime states are unchanged. The data store can have composition state for composite services previously created and corresponding runtime state for each composition state. There can be the step of creating composition engine state snapshots in the data-store 14 by the processing unit 12 during runtime by storing a snapshot for each created composite service. Each composition engine state snapshot can have a reference to a corresponding composite service template, a resulting composite service, and a runtime system state at a time of composite service creation.

The locating step can include the step of detecting two composite engine state snapshots are completely identical. There can be the step of storing in a snapshot only information which has an effect on the composite service.

The data-store can include a table and wherein the detecting step can include the step of performing a field by field comparison of values in a row for all rows in the table with the processing unit. The detecting step can include the step of performing a field by field comparison with the processing unit, but starting with a row having a smallest number of fields.

Alternatively, the detecting step can include the steps of building a checksum with the processing unit over all fields in a row, and comparing only the checksum with the processing unit. Alternatively, the detecting step can include the steps of building a tree or graph with the processing unit based on the data-store and applying tree or graph search algorithms on them with the processing unit. Alternatively, the detecting step can include the step of performing a string comparison of queries to the data-store by the processing unit to locate a corresponding query, and using a result from the corresponding query.

The locating step can include the steps of detecting that a flag is set to indicate a change to the data-store by the processing unit, and obtaining additional information from the database by the processing unit.

The locating step can include the steps of building a first checksum from system state data for each composite service in the database by the processing unit, building a second checksum from a present state of the current predetermined values by the processing unit, and determining changes to the system state for each composite service by comparing the first checksum and the second checksum with the processing unit.

In the operation of the invention, there is provided a technique for creating composite services based on data from previous composite service sessions. This data may be reused if applicable in order to avoid repeating time and resource consuming steps in the composition process. This way a significant reduction in latency may be achieved.

A Composition Engine state snapshot for a given session contains the following data:
  reference to the corresponding composite service template
  resulting composite service
  run-time system state at the time of composite service creation
    session information
    Service database version information
    User profile version information
    Other system properties A service composition engine is a system that provides a complex service (composite service) by identifying and executing a number of constituent software components. Such a node requires information about the constituent components for its operation. This information can consist of the following:
  A domain model
  Descriptions of constituent components (service descriptions)
  Description of the composite service (composite service template)
  Session information
  User profile information
  Other system properties (device capabilities, network status)

This information will be referenced further as run-time state.

An algorithm for such a composition engine (as described in reference PCT/EP2007/002956) creates a composite service by determining one constituent service after another while taking the run-time state into account. A large part of the latency introduced by the composition algorithm is due to constant consultation of the run-time state.

A composite service creation algorithm that works deterministically will always create the same composite service under the same circumstances, i.e. given the same run-time state; it will lead to the same service selection decision.

Figure 4:
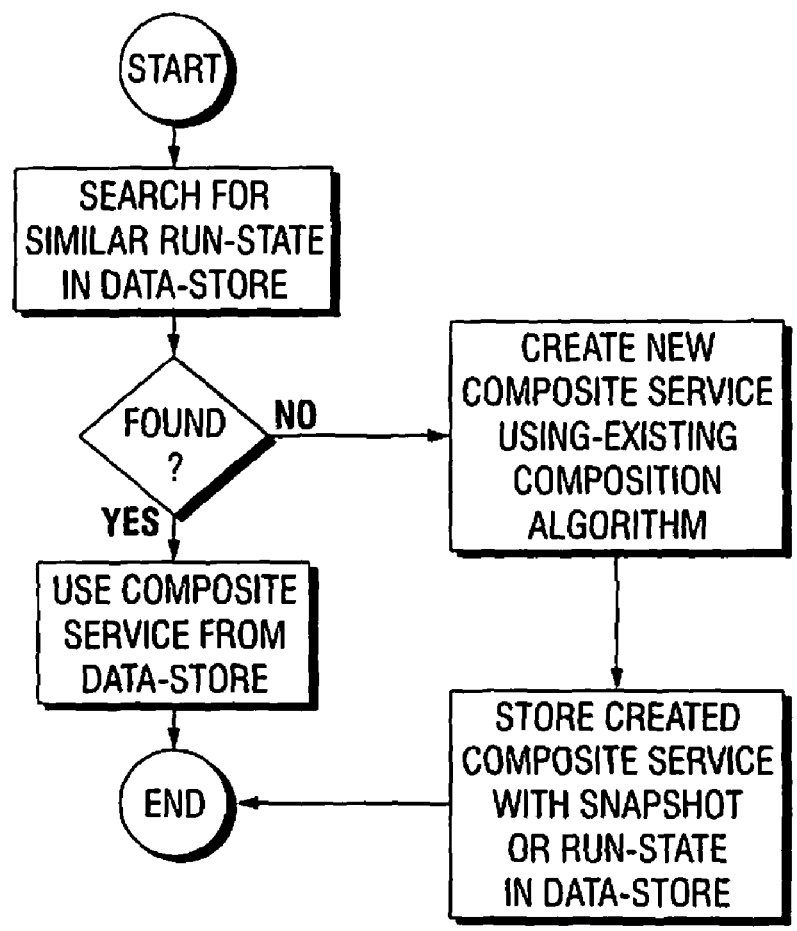
FIG. 4 is a flow chart regarding the present invention.

The invention constitutes a new composition mechanism that efficiently identifies still valid decisions taken by the composition engine in the past, without renewed consultation of the run-time state or renewed use of the composition algorithm. Composition decisions are still valid when all relevant run-time state is still unchanged. See FIG. 4.

This mechanism thereby enables the reuse of past composition decisions thereby eliminating the latency resulting from composite service creation. Consequently, once successfully created, a composite service (and all related service selection criteria) can be reused as long as the current run-time state is the same or equivalent to the run-time state at the time of creation of the original composite service instance.

Identifying and reusing valid composition decisions is based on the availability of all relevant composition engine state from the time of the original composite service creation is available.

The information used by the composition engine during composite service creation is defined as composition state.

For this purpose, the composite state data-store 14 is introduced. This data-store 14 contains all composition state for each composite service created in the past. Composition state is stored together with its corresponded run-time state. A previously created composite service can be reused in case the run-time state information that had an impact on this composite service is the same. Only the information that had impact on composite service has to be stored in the data-store 14. Which run-time state information has an impact on composite service can be identified by composition engine state during the composite service creation.

The data-store 14 may be implemented in number of ways, e.g. as relational database, as hash-table, as tree or graph. The following text contains examples formulated based on a simple table form (see table 1).

TABLE 1

Example 1: Composition state data-store 14

| Data-store ID | Composition template ID | DB version (service description composition templates) | System state (load, number of sessions, number of alarms, available bandwidth) | Session (type, method) | User profile (subscription type, prepaid/postpaid, service profile, location, presence) | Composite service |
|---|---|---|---|---|---|---|
| Xjh56s7dkf | Sd34g6s89gh | 5hdf28, 9fcx256 | 45, 5320, 0, 55 | SIP, INVITE | gold, postpaid, data_profile, 229, online | ServiceA ServiceB |
| G78sdjjhj | Sd34g6s89gh | 5hdf28, 9fcx256 | 23, 5329, 0, 27 | SIP, INVITE | silver, postpaid, data_profile, 565, online | ServiceA ServiceC |

TABLE 1-continued

Example 1: Composition state data-store 14

| Data-store ID | Composition template ID | DB version (service description composition templates) | System state (load, number of sessions, number of alarms, available bandwidth) | Session (type, method) | User profile (subscription type, prepaid/postpaid, service profile, location, presence) | Composite service |
|---|---|---|---|---|---|---|
| sdh34dg | thalio223 | 67ghgsd, 2hjjztz | 56, 67672, 2, 67 | SIP, MESSAGE | silver, prepaid, voice_profile, 788, busy | ServiceD ServiceC |

In this example the composition state data-store 14 contains following attributes:
  data-store ID is a unique identifier of the composition engine state snapshot
  composition template id is a unique identifier of a composition template that was used as a basis for composite service
  DB version (service descriptions, composition templates) is a unique identifier of state of service descriptions database and of composition templates database. These help to identify changes in these databases. As of the date of latest changes, hash value of all items or version number, that increments after every change, can be used.
  System state (load, number of sessions, number of alarms, available bandwidth) describes system state at the time of composite service creation, which can include various run-time variables. In this example, it includes system load, number of active sessions, number of raised alarms and available bandwidth.
  Session (type, sip. method) describes session state at the time of composite service creation. In this example, it includes the type of session (e.g. SIP or web triggered) and the used triggering method (e.g. INVITE, MESSAGE, PUBLISH for SIP or POST and GET for web triggered sessions).
  User profile (subscription type, prepaid/postpaid, service profile, location, presence) describes the user profile properties at the time of composite service creation. Examples here are subscription type (e.g. gold, silver), charging type (e.g. prepaid, postpaid), reference to service profile, location information and the presence sate.
  Composite service contains resulting composite service, i.e. a list of constituent services that were included into a composite service.

Figure 1:
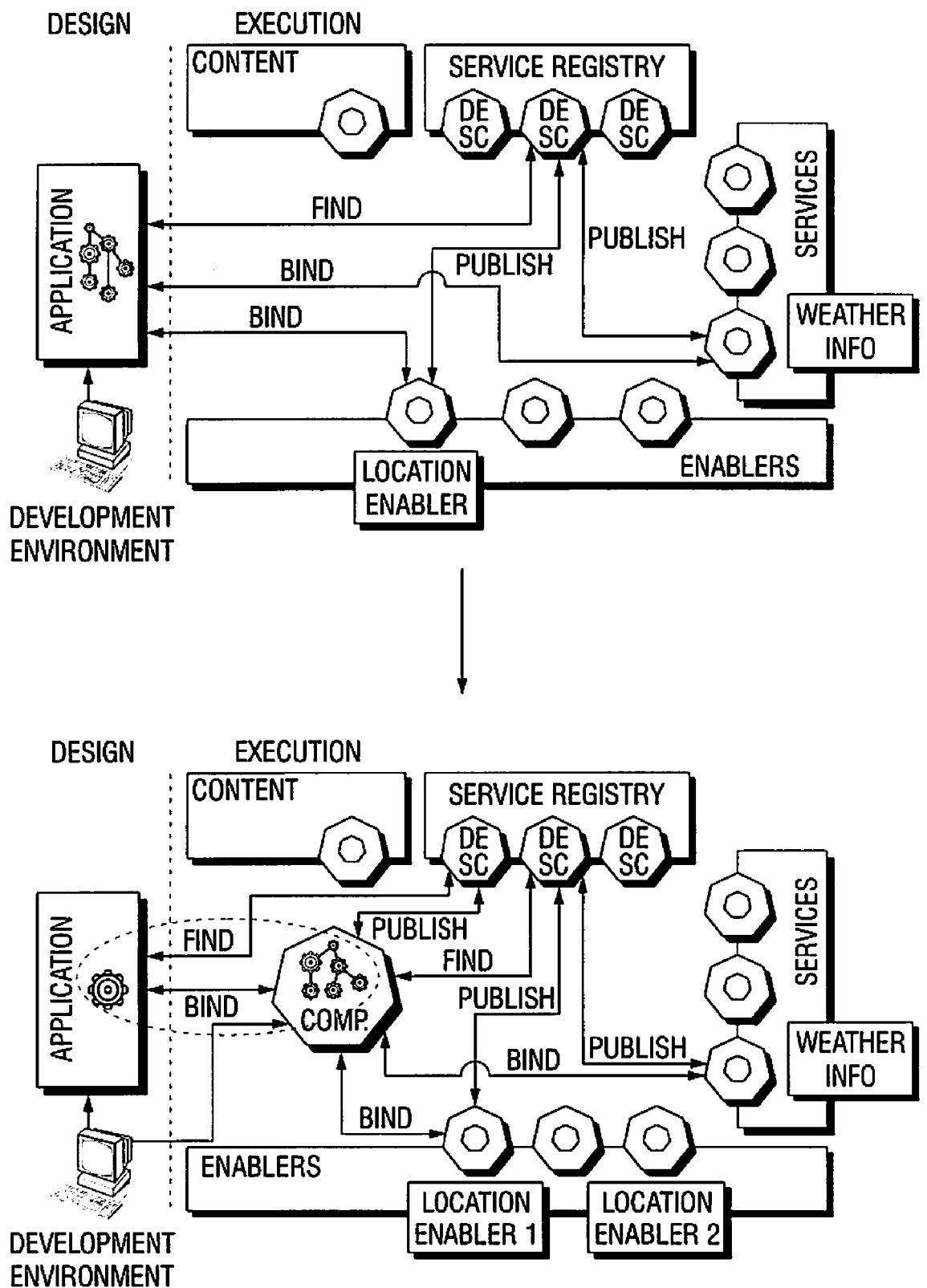
FIG. 1 shows supporting service creation through service composition.
Figure 2:
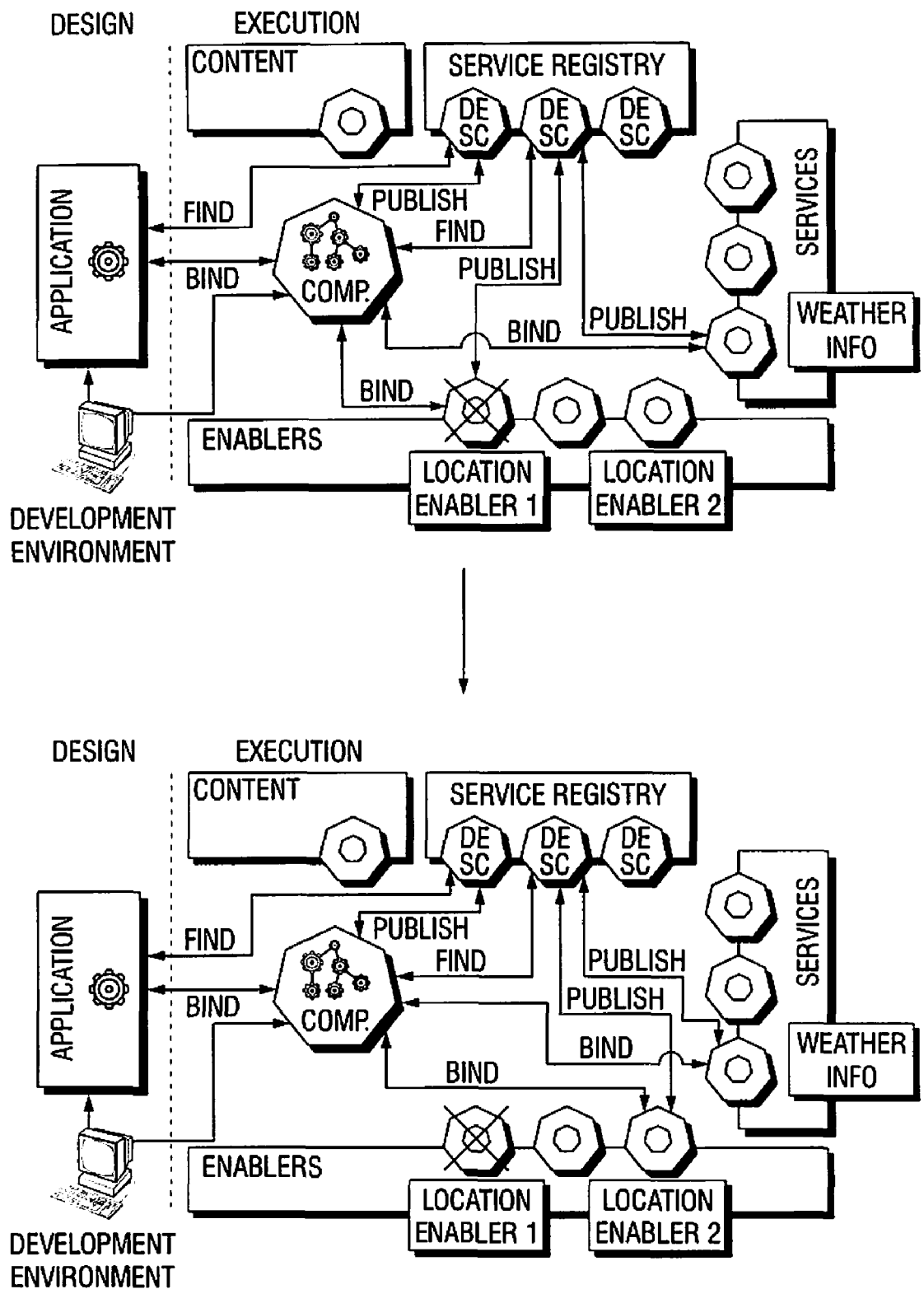
FIG. 2 shows event-driven logic based on service composition.
Figure 3:
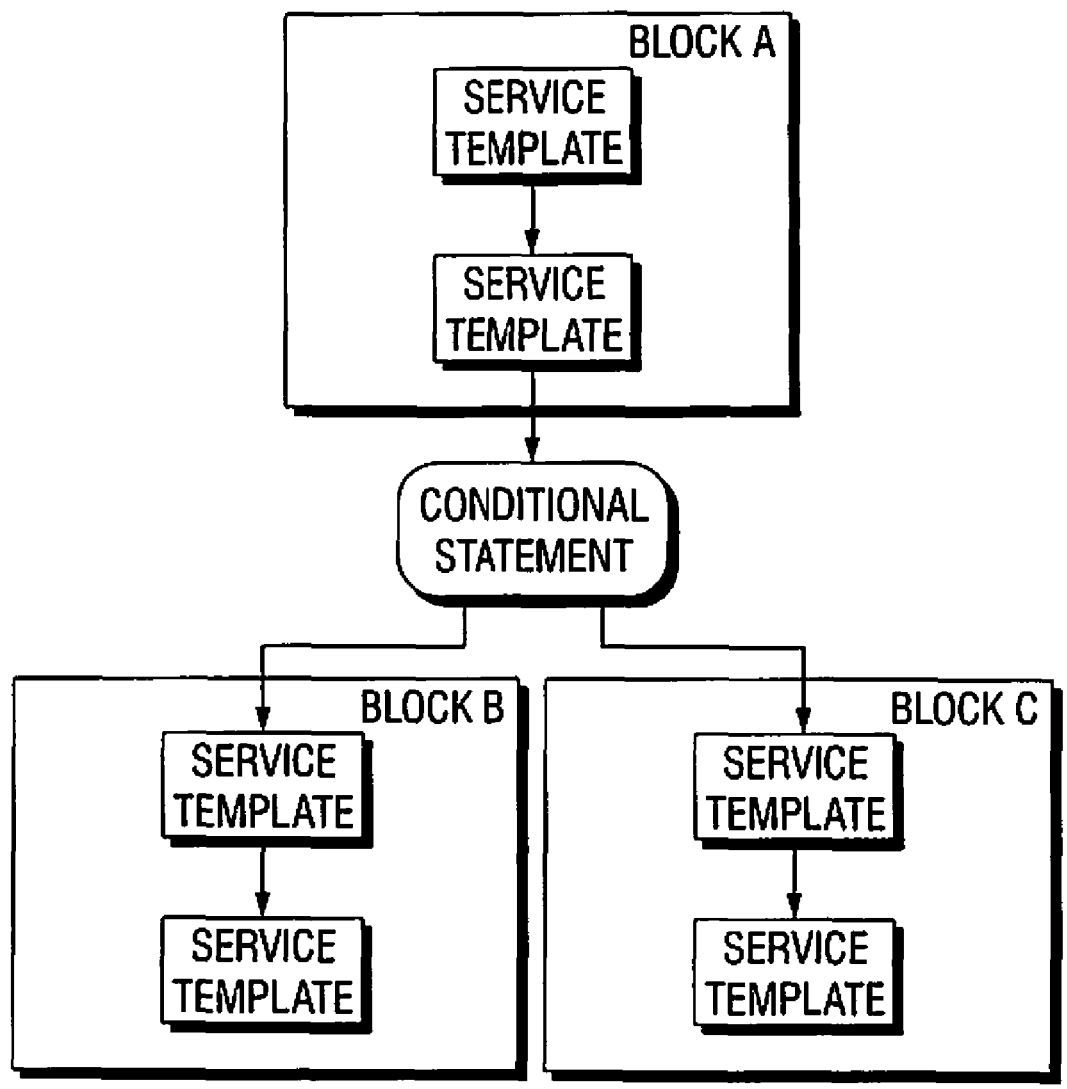
FIG. 3 is a block diagram of an example of a composition template.

Instead of storing the complete composite service in a composition engine state, a set of decisions on service selection with related run-time state can be stored in the composition engine state. This enables the reuse of a part of composite service. For example if a composition template contains a conditional statement, the different branches can be stored in the data-store 14 separately (see BlockA, BlockB and BlockC in FIG. 3).

How big blocks should be either detected automatically based on some heuristic (e.g., block should depend as a maximum on two runtime variables and should contain a maxim three service templates) or can be defined by a composition template developer, e.g., the developer can mark the most reusable parts of skeletons.

The information in the data-store 14 has different properties, such as frequency of changes, a value range, etc. This can be taken into consideration for further optimization. For example, while the runtime and session information change continuously, composite service templates and service descriptions change very seldom. Instead of comparing composite service templates and service descriptions every time, the changes can be tracked and reported to a case repository using subscribe-notify algorithms, i.e., data-store 14 subscribes itself by service description database and will be notified in case of changes. In case the composition engine state snapshots were changed, composite service templates or a service description is referenced and will be marked as invalid or removed from data-store 14. Further, instead of storing the run-time in a Composition Engine state snapshot, a hash of run-time or parts of run-time state can be stored.

The existing composition algorithm has to be extended by three additional activities:
  1. retrieving of the similar composite services from data-store 14
  2. reusing of existing composite service
  3. storing of new composite service with corresponding run-time state Many optimizations of this case-based service composition are imaginable.

In regard to similarity detection between two Composition Engine state snapshots, two composition engine state snapshots are considered as similar if they are completely identical. In the case when snapshots are stored as rows in a table, as indicated above in Table 1, the similarity would mean, that the rows of two snapshots have the same values over all as the columns except the two special columns: "data-store id", "composite service".

An important point here (and as stated above) is that only the information that has an effect on the composite service has to be stored in a snapshot, e.g., if the composite service depends only on available bandwidth and type of user subscription, then the snapshot will contain only this information and only this information will be compared.

Which information has an effect on composite service can be identified by the composition engine during the service creation by analyzing the composition template. Different search algorithms can be applied to find a snapshot in the data-store that is identical to the current state:
  brute-force: perform a field by field comparison of values in a row for all rows in the table
  optimized brute-force: perform a field by field comparison, but start with the row having the smallest number of fields.
  checksum comparison; build a checksum (e.g. CRC32) over all fields in a row and then compare only the checksum.
  tree or graph search: build a tree or graph based on the data-store and apply tree or graph search algorithms on them.

Which algorithm is more efficient depends on the size of the data-store and number of fields in snapshots.

In regard to identifying changes to the environment, changes in the environment may be of two general types, i) changes to the service database and ii) changes to the overall system state, e.g., time of day, available bandwidth, presence state of people and services, functional state (registered faults), etc.

Changes to the database state can be easily detected through a flag that may be set by the Database Management System (DBMS) when performing write access to relevant database areas. This flag may be queried by the Composition Engine as a matter of course before every query to the database. If the query is "true", then further queries to obtain fresh information from the database are needed.

Changes to the general environment are more complex since there is no database where this information is normally stored. It is suggested that the data-store may contain—on a per composite service basis—a checksum built from relevant system state data for each individual composite service handled by the engine. A composite service then behaves differently based on the presence of a group of people, e.g., do something if he is busy, do something else if he is free, and the service may store a checksum of their present states in the data-store. The engine will then be required to keep a corresponding checksum based on the current values of these properties available. Changes on the system state related to an individual composite service may be identified by simply comparing the two checksums.

There may be many algorithms for performing the task of identifying similar states. The one that has been chosen to be implemented currently and is considered a preferred embodiment is a simple string comparison of the queries towards the service repository. When the engine tries to identify a new service to include in the composite service, it would typically consult the service database after processing all constraints to generate the correct query. This query may be stored and compared, if at a later stage the Engine attempts to do the same query, the last valid (provided system state has not changed) result may be used instead.

EXAMPLES

Example 1

Service Selection is Dependent on or Independent of Run-Time State

Figure 5:
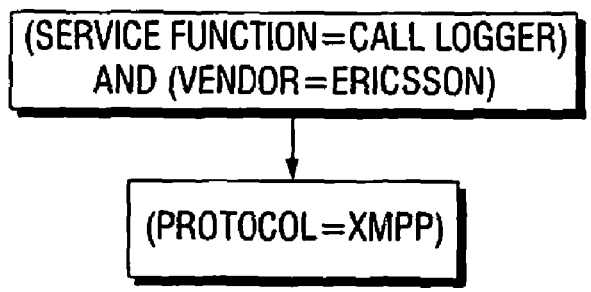
FIG. 5 is a composition template regarding a first example.

Given a composition template defined in FIG. 5.

Figure 6:
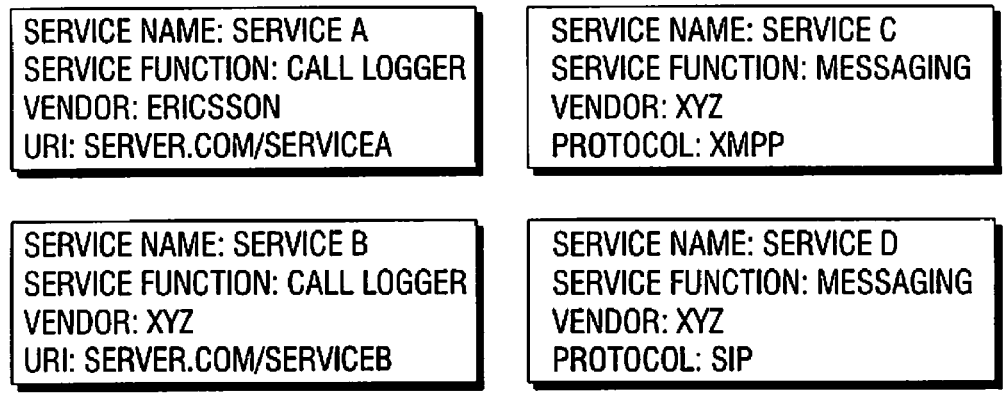
FIG. 6 is a block diagram regarding four service descriptions.

This template describes a service composition containing two services:

first service is a service that provides call logger function and has Ericsson as vendor, second service is service with support for xmpp protocol The particular service that will be included in the composite service decides the composition engine at runtime based on this composite service template and on service descriptions. Let's assume that service database contains four service descriptions, as shown in FIG. 6.

Then the composition engine will create a composite service containing serviceA and serviceC. As long as service descriptions are not changed the composition engine will make the same service selection dependent on or independent of run-time state. So, this composite service can be stored in data-store 14 and reused again without any adaptation.

Example 2

Services Selection Depends on Run-Time State

Figure 7:
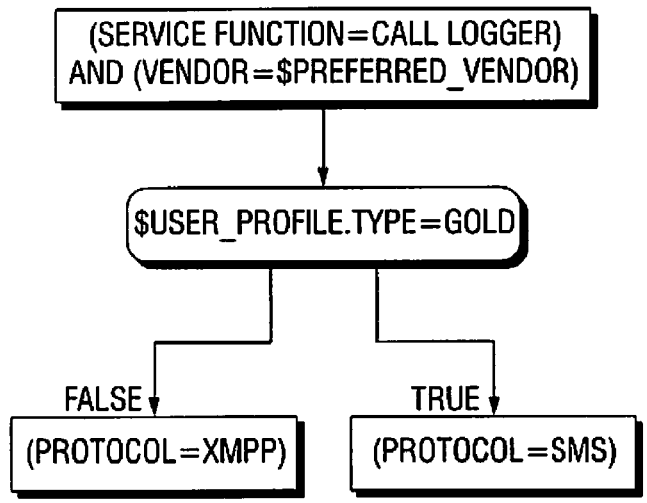
FIG. 7 is a composition template regarding a second example.

Given a composition template defined in FIG. 7.

This composition template consists of 3 service templates and 1 conditional statement, that depends on a result of the conditional statement; the service template with constraints (protocol=xmpp) or the service template with constraints (protocol=sms) will be evaluated.

The selection of a particular decision at the place of the first service templates depends on a value of runtime variable $preferred_vendor. Consequently, in case the service descriptions database is the same and the $preferred_vendor has the same value the composition engine will take the same service at the place of the first service template. The second and third template do not contain any references to runtime information, however the evaluation of these service templates depends on a result of a conditional statement in which the user profile variable $user_profile.type is referenced. Hence, which service will be included as second service in the composite service also depends on this user profile variable.

In summary, the composition engine will create the same composition service based on this composition template as long as the database with service description is the same and the runtime variables $preferred_vendor and $user_profile.type have the same values.

Let's assume that in case variable $preferred_vendor has the value "Ericsson" and $user_profile.type has the value "gold" composite service containing the following two services will be created: EricssonLoggingService and SendSMSService. In case where $preferred_vendor is "Ericsson" but $user_profile.type is "silver" the composite service will include EricssonLoggingService and SendXMPPService. Then the data-store 14 implemented as a table can look like the following:

| Data-store ID | Composition template ID | DB version (service descriptions, composition templates) | $preferred_vendor | $user_profile.type | Composite service |
| --- | --- | --- | --- | --- | --- |
| Qwrt1 | Sd34g6s89gh | 5hdf28, 9fcx256 | Ericsson | gold | EricssonLoggingService SendSMSService |
| Dkjsd | Sd34g6s89gh | 5hdf28, 9fcx256 | Ericsson | Silver | EricssonLoggingService SendXMPPService |

The invention leads to shorter lead time for selection of constituent services and therefore to a shorter lead time in building the complete composite service. This improves the user experience as shorter delays can be expected until the wanted telecommunication service is set up. Also a given application server node that works with service composition technology and is enhanced with this invention would show higher capacity (users that can be served) due to the decreased effort needed to set up a single composite service.

REFERENCES

PCT/EP2007/002956—Ericsson patent application titled "Technique for creating, modifying and executing composite services in a telecommunication network"

EP 07010735-4—Ericsson patent application titled "Technique for controlling a service composition process in a telecommunication network"

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for creating composite services, the method implemented by an apparatus comprising the steps of:
    identifying a constituent component for a composite service by a processing unit, the constituent component having a runtime state;
    locating a past composition decision regarding the constituent component that has equivalent runtime state in a data-store by the processing unit;
    reusing the past composition decision for the constituent component for the composite service by the processing unit;
    where the data store has composition state for composite services previously created and corresponding runtime state for each composition state;
    creating composition engine state snapshots in the data-store by the processing unit during runtime by storing a snapshot for each created composite service;
    where each composition engine state snapshot has a reference to a corresponding composite service template, a resulting composite service, and a runtime system state at a time of composite service creation, where the runtime system state at a time of composite creation includes session information, service database version information, and user profile version information; and
    where the runtime state includes a domain model, descriptions of constituent components, description of the composite service, session information, user profile information, device capabilities, and network status.

2. The method as described in claim 1 wherein the reusing step includes the step of reusing the past composition decision for the constituent component without renewed consultation of the runtime state or renewed use of a composition algorithm.

3. The method as described in claim 2 wherein the composition decision is valid when all relevant runtime states are unchanged.

4. The method as described in claim 1 wherein the locating step includes the step of detecting two composite engine state snapshots that are completely identical.

5. The method as described in claim 4 including the step of storing in, a snapshot, only information which has an effect on the composite service.

6. The method as described in claim 5 wherein the data-store includes a table and the detecting step includes the step of performing a field by field comparison of values in a row for all rows in the table with the processing unit.

7. The method as described in claim 5 wherein the data-store includes a table and the detecting step includes the step of performing a field by field comparison with the processing unit, beginning with a row having a smallest number of fields.

8. The method as described in claim 5 wherein the data-store includes a table and the detecting step includes the steps of building a checksum with the processing unit over all fields in a row and comparing only the checksum with the processing unit.

9. The method as described in claim 5 wherein the data-store includes a table and the detecting step includes the steps of building a tree or graph with the processing unit based on the data-store and applying tree or graph search algorithms on them with the processing unit.

10. The method as described in claim 5 wherein the data-store includes a table and wherein the detecting step includes the step of performing a string comparison of queries to the data-store by the processing unit to locate a corresponding query and using a result from the corresponding query.

11. The method as described in claim 1 wherein the locating step includes the steps of detecting that a flag is set to indicate a change to the data-store by the processing unit, and obtaining additional information from the data-store by the processing unit.

12. The method as described in claim 1 wherein the locating step includes the steps of building a first checksum from system state data for each composite service in the data-store by the processing unit, building a second checksum from a present state of the current predetermined values by the processing unit, and determining changes to the system state for each composite service by comparing the first checksum and the second checksum with the processing unit.

13. An apparatus for creating composite services comprising:
    a processing unit configured to identify a constituent component for a composite service, the constituent component having a runtime state; and
    a data-store configured to store past composition decisions and corresponding runtime states;
    the processing unit configured to locate a past composition decision regarding the constituent component that has equivalent runtime state in the data-store and reusing the past composition decision for the constituent component for the composite service;
    the processing unit configured to reuse the past composition decision for the constituent component for the composite service;
    the data store configured to store composition state for composite services previously created and corresponding runtime state for each composition state;
    the processing unit configured to create composition engine state snapshots in the data-store during runtime by storing a snapshot for each created composite service;
    where each composition engine state snapshot has a reference to a corresponding composite service template, a resulting composite service, and a runtime system state at a time of composite service creation, where the runtime system state at a time of composite creation includes session information, service database version information, and user profile version information; and
    where the runtime state includes a domain model, descriptions of constituent components, description of the composite service, session information, user profile information, device capabilities, and network status.

14. The apparatus as described in claim 13 wherein the processing unit is configured to reuse the past composition decision for the constituent component without renewed consultation of the runtime state or renewed use of a composition algorithm.

15. The apparatus as described in claim 14 wherein the composition decision is valid when all relevant runtime states are unchanged.

16. The apparatus as described in claim 15 wherein the data store is configured to store composition state for composite services previously created and corresponding runtime state for each composition state.

17. The apparatus as described in claim 13 wherein the processing unit is configured to create composition engine state snapshots in the data store during runtime by storing a snapshot for each created composite service.

18. The apparatus as described in claim 17 wherein each composition engine state snapshot has a reference to a corresponding composite service template, a resulting composite service, and a runtime system state at a time of composite service creation.

19. A method for creating composite services, the method implemented by an apparatus comprising the steps of:
   identifying a constituent component for a composite service by a processing unit, the constituent component having a runtime state;
   locating a past composition decision regarding the constituent component that has equivalent runtime state in a data-store by the processing unit;
   reusing the past composition decision for the constituent component for the composite service by the processing unit;
   where the data store has composition state for composite services previously created and corresponding runtime state for each composition state;
   creating composition engine state snapshots in the data store by the processing unit during runtime by storing a snapshot for each created composite service;
   where each composition engine state snapshot has a reference to a corresponding composite service template, a resulting composite service, and a runtime system state at a time of composite service creation, where the runtime system state at a time of composite creation includes session information, service database version information, and user profile version information;
   where the runtime state includes a domain model, descriptions of constituent components, description of the composite service, session information, user profile information, device capabilities, and network status;
   where the locating step includes step of detecting two composite engine snapshots that are completely identical except for data store identification and composite service; and
   storing in the composition engine state snapshots only information which has an effect on the composite service where the information which has an effect on the composite service is identified by a composition engine during service creation by analyzing a composition template.

20. An apparatus for creating composite services comprising:
   a processing unit configured to identify a constituent component for a composite service, the constituent component having a runtime state; and
   a data-store configured to store past composition decisions and corresponding runtime states;
   the processing unit configured to locate a past composition decision regarding the constituent component that has equivalent runtime state in the data-store and reusing the past composition decision for the constituent component for the composite service,
   the processing unit configured to reuse the past composition decision for the constituent component for the composite service;
   the data store configured to store composition state for composite services previously created and corresponding runtime state for each composition state;
   the processing unit configured to create composition engine state snapshots in the data store during runtime by storing a snapshot for each created composite service;
   where each composition engine state snapshot has a reference to a corresponding composite service template, a resulting composite service, and a runtime system state at a time of composite service creation, where the runtime system state at a time of composite creation includes session information, service database version information, and user profile version information;
   where the runtime state includes a domain model, descriptions of constituent components, description of the composite service, session information, user profile information, device capabilities, and network status;
   where the processing unit is configured to locate the past composition decision by being further configured to detect two composite engine snapshots that are completely identical except for data store identification and composite service; and
   where the processing unit is configured to store in the composition engine state snapshots only information which has an effect on the composite service where the information which has an effect on the composite service is identified by a composition engine during service creation by analyzing a composition template.

* * * * *